US 6,586,010 B1

(12) United States Patent
Bertleff et al.

(10) Patent No.: US 6,586,010 B1
(45) Date of Patent: Jul. 1, 2003

(54) METHOD FOR PRODUCING AGGLOMERATES COMPRISING A CORE-SHELL STRUCTURE

(75) Inventors: Werner Bertleff, Viernheim (DE); Ulrich Bröckel, Freinsheim (DE); Helmut Fricke, Mutterstadt (DE); Hans-Peter Harz, Dudenhofen (DE); Reiner Witt, St Leon-Rot (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/857,065
(22) PCT Filed: Dec. 3, 1999
(86) PCT No.: PCT/EP99/09462
§ 371 (c)(1), (2), (4) Date: May 31, 2001
(87) PCT Pub. No.: WO00/33819
PCT Pub. Date: Jun. 15, 2000

(30) Foreign Application Priority Data

Dec. 4, 1998 (DE) .......................... 198 56 149

(51) Int. Cl.$^7$ .................. A61K 9/14; A61K 9/16; A61K 9/62; A61K 9/64
(52) U.S. Cl. .................. 424/489; 424/460; 424/461; 424/462; 424/490
(58) Field of Search ................. 424/462, 461, 424/460, 489, 490

(56) References Cited

U.S. PATENT DOCUMENTS

| 5,034,352 A | * | 7/1991 | Vit et al. ................... 623/16 |
| 5,296,236 A | | 3/1994 | Santus et al. ............... 424/490 |
| 5,348,747 A | | 9/1994 | Bianco ...................... 424/490 |
| 5,405,619 A | | 4/1995 | Santus et al. ............... 424/490 |
| 5,480,654 A | | 1/1996 | Tanaka et al. .............. 425/490 |
| 5,510,119 A | | 4/1996 | Santus et al. ............... 424/490 |
| 5,618,562 A | | 4/1997 | Saito et al. ................. 424/489 |

FOREIGN PATENT DOCUMENTS

GB 2 241 889 9/1991

* cited by examiner

Primary Examiner—Thurman K. Page
Assistant Examiner—S. Tran
(74) Attorney, Agent, or Firm—Keil & Weinkauf

(57) ABSTRACT

A process for producing agglomerates with a core/shell structure, in which i) initial agglomerates containing a first particulate solid are prepared; ii) a second particulate solid is agglomerated in the presence of the initial agglomerates with the addition of a binder liquid to give second stage agglomerates and, where appropriate, iii) an nth (n≥3) solid is agglomerated in the presence of the (n−1)th stage agglomerates with the addition of a binder liquid to give nth stage agglomerates.

7 Claims, 1 Drawing Sheet

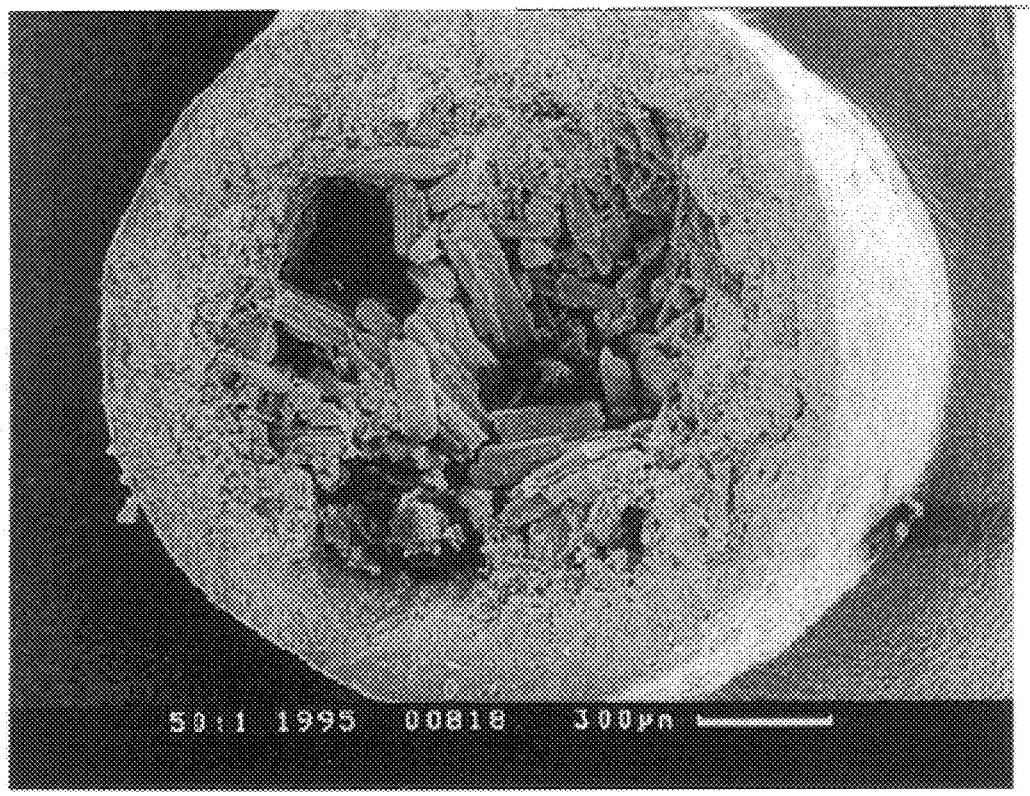

METHOD FOR PRODUCING AGGLOMERATES COMPRISING A CORE-SHELL STRUCTURE

This application is a 371 of PCT/EP99/09462 filed Dec. 3, 1999.

DESCRIPTION

The present invention relates to a process for producing agglomerates with a core/shell structure and to the agglomerates obtainable thereby.

Agglomeration is to be understood here to be a process in which fine-pile substances are clumped together by wetting with a liquid with simultaneous mechanical agitation to give conglomerates, i.e. pellets or granules. The resulting agglomerates are assemblages of particles in which the original particles are not completely fused together, it being possible, for example by microscopic examination, still to recognize the outlines of some of the individual particles. An agglomerated material has numerous advantages over the fine-particle starting material. Thus, certain properties such as strength, size, shape and porosity can be adjusted in a defined manner, which is noticeably advantageous on storage, transport and metering. Any homogeneities are prevented, the bulk properties are improved and the formation of dust during packaging and transferring is reduced. This increase in quality makes the additional agglomeration processing step justifiable in the manufacture of numerous products such as drugs.

In what is called agitative agglomeration there is automatic attachment of the particles together on wetting with liquid on the reaction of interfacial forces while the material is agitated mechanically.

A special type of agitative agglomeration is rewetting agglomeration. The basis for this is a 3-phase mixture which consists of a fine material to be agglomerated and of a suspending liquid and a binder liquid which must not be miscible with one another. The binder liquid must have the property of wetting the suspended material better than does the suspending liquid. The fine material to be agglomerated is present in suspended form in the suspending liquid. The binder liquid is then introduced and interacts with the fine particles and leads to particle size enlargement. The granules which are formed are removed from the reusable suspending liquid, for example using a filtration apparatus.

Many drugs can be administered in solid form as agglomerates. These dissolve in the body over a certain period. The rate of dissolution is determined by the area of the drug available for attack by body fluid, i.e. the surface area of the drug. If the surface area is reduced by the dissolution process, a smaller amount of active ingredient is released per unit time. However, for most applications a constant rate of release of active ingredient is desired. One aspect of the present invention is therefore based on the object of indicating a process for producing agglomerates which show essentially uniform release of active ingredient throughout the dissolution period.

It is often desirable to produce solid drug forms with more than one active ingredient, with the active ingredients being released at different times.

Another aspect of the invention is therefore based on the object of indicating a process for producing agglomerates which contain different active ingredients which are released successively.

DE-A 44 00 295 describes a spherical granulum which is prepared by introducing lactose particles into a granulating and coating apparatus equipped with a horizontal rotating disk having a flat contacting surface towards the granula, and spraying a lactose solution during rotation of the rotating disk. The granulum is useful as carrier for drugs and foodstuff.

We have found that the above objects are achieved by a process for producing agglomerates with a core/shell structure, in which i) initial agglomerates containing a first particulate solid are prepared; ii) a second particulate solid is agglomerated in the presence of the initial agglomerates with the addition of a binder liquid to give second stage agglomerates and, where appropriate, iii) an nth (where n is a positive integer $\geq 3$) solid is agglomerated in the presence of the (n−1)th stage agglomerates with the addition of a binder liquid to give nth stage agglomerates. Step iii) is optional. It can, if required, be repeated one or more times. The value of n starts at 3 and increases by 1 after every repetition.

FIG. 1 shows a scanning electron micrograph of a fractured agglomerate produced according to the invention.

In the process according to the invention a particulate solid is agglomerated in the presence of initial agglomerates. The initial agglomerates act as agglomeration nuclei. It has been found, surprisingly, that it is possible under these conditions for the particulate solid to become attached in the form of a shell to the preformed agglomeration nuclei, not to itself with spontaneous formation of new nuclei. The agglomerates obtained in this way are able in turn to act as agglomeration nuclei for the agglomeration of further identical or different solids.

The agglomerates obtained according to the invention comprise a core and at least one shell disposed on the core. If more than one shell is desired, optional step iii) is carried out, where appropriate repeatedly. It is possible in this way to obtain core/shell agglomerates with two or more, for example three, four or five etc., shells around one core. The ratio by weight of core to first shell, or the ratio by weight of the inner shell to the outer shell of a pair of consecutive shells, is preferably in the range from 1:9 to 9:1, in particular 1:9 to 8:2.

The process according to the invention can be carried out as conventional agitative agglomeration, with agglomeration nuclei and particulate solid being exposed, preferably with the addition of the ancillary substances discussed below, to the mechanical agitation while being wetted by the binder liquid. Suitable for this purpose are all conventional types of mixer such as conical mixers, horizontal or vertical mixers or drum mixers, where appropriate with a chopper.

Alternatively, the process according to the invention can be carried out in the form of a rewetting agglomeration. In this case, the clumping together of the particulate solid takes place in the liquid phase. Agglomeration nuclei, particulate solid and, where appropriate, ancillary substances are dispersed in a suspending liquid. The suspending liquid must be chosen so that both agglomeration nuclei and on the other hand the particulate solid are essentially insoluble therein. The binder liquid is introduced into this suspension. Binder liquid and suspending liquid must be chosen to be essentially immiscible with one another. The introduction of the binder liquid can take place directly through a nozzle or in the form of an emulsion of binder and suspending liquids. The binder liquid must be chosen so that it wets the particulate solid better than does the suspending liquid. On exposure to the binder liquid, the solid particles interact and agglomerate in the form of a shell around the agglomeration nuclei. Suitable for carrying out the rewetting agglomeration is, for example, a stirred vessel or a continuously operated cylindrical stirrer as described, for example, in EP-A-0 690 026. Removal of the agglomerates which are formed from the suspending liquid can take place through any apparatus suitable for this purpose, for example a filtration apparatus. The agglomerates can then be dried.

The nature of the particulate solids in each case is not critical for the present invention and is subject to essentially no restrictions. Where reference is made herein to a "particulate solid" some of this may also comprise a mixture of solids. "Particulate" means that the solid is in the form of separate particles which are subject to essentially no interactions before the agglomeration. These often comprise hard, brittle, nontacky substances which cannot be directly molded. Examples which may be mentioned are salts such as potassium chloride, ammonium sulfate, calcium phosphate, diammonium phosphate, potassium phosphate, calcium carbonate; molecular organic compounds such as urea, theophylline, verapamil; three-dimensionally crosslinked compounds such as zeolites; polymeric compounds such as polyethylene glycols with a molecular weight of, for example, 6000 to 9000, polymers or copolymers of ethylenically unsaturated mono- and dicarboxylic acids such as (meth)acrylic acid or maleic acid, and modified, e.g. wholly or partly neutralized, variants thereof; etc.

The particle size may vary within wide limits. A general range which may be mentioned is from 1 to 1000 $\mu$m, preferably 1 to 500 $\mu$m. Suitable particle sizes can be obtained by crystallization, mechanical comminution of compact forms, e.g. by grinding, chopping, crushing and sublimation.

In preferred embodiments, an active pharmaceutical ingredient, where appropriate mixed with ancillary substances, is used as particulate solid in the core and/or at least one shell. Active pharmaceutical ingredient means for the purpose of the invention any substance with a desired effect on the human or animal body or plants. It is also possible to employ combinations of active ingredients.

Preferred examples of active ingredients which can be employed for the purpose of the invention are, inter alia, verapamil, theophylline, ibuprofen, ketoprofen, flurbiprofen, acetylsalicylic acid, paracetamol, nifedipine or captopril.

The particulate solids, in particular active ingredients, can also be admixed with ancillary substances to construct the core and/or a shell. Suitable ancillary substances are the binders mentioned below. Further ancillary substances which can be used are extenders and fillers such as silicates or diatomaceous earth, magnesium oxide, titanium dioxide, methylcellulose, sodium carboxymethylcellulose, talc, sucrose, lactose, cereals or corn starch, potato flour, polyvinyl alcohol, Aerosil, etc. It is also possible to add dyes, wetting agents, preservatives and disintegrants.

The particulate solids present in the core and in the first shell or in subsequent shells preferably differ in at least one chemical and/or physical property.

These solids may comprise different chemical species. They may also comprise mixtures of varying composition or a pure substance and a mixture. A typical example thereof is, for example, the application of a mixture of a dye with one or more active ingredients and/or ancillary substances to a core containing no dye.

In other embodiments, the solids in the core and in the first shell or in two consecutive shells differ in at least one physical property, in particular in the particle size. In these embodiments the first and second particulate solid and/or for at least one value of n the (n−1)th and the nth solid have different particle sizes.

Thus, for example, solids comprising identical substances but differing in at least one physical property, e.g. differing in particle size, can be employed. This is of interest, for example, in cases where it is desired to have uniform release characteristics of active ingredients on dissolving the agglomerates produced according to the invention. Thus, for example, it is possible to combine a porous core of solids with a larger particle size and a more compacted shell of solids with a smaller particle size. The porous core would compensate for the decreasing surface area on dissolving of the agglomerate and ensure that the release rate does not decrease significantly. It is generally preferred for the solid in the first shell to have a smaller particle size than the solid in the core, or for the solid in an outer shell to have a smaller particle size than the solid in the underlying shell.

The second particulate solid therefore preferably has a smaller particle size than the first particulate solid and/or for at least one value of n, in particular for all values which n can assume, the nth particulate solid has a smaller particle size than the (n−1)th particulate solid.

The first particulate solid preferably has a particle size of 50–800 $\mu$m, in particular 100–500 $\mu$m, in the direction of the longest dimension. The second particulate solid preferably has a particle size of less than 500 $\mu$m, in particular less than 50 $\mu$m. The second particulate solid generally has a particle size of at least 1 $\mu$m.

It is possible in a specific case for the first and second particulate solid or the particulate solids in consecutive shells to be identical. Thus, it may be advantageous to apply not one shell in a very thick layer but several shells in layers less thick. Further advantages may occasionally be obtained when the agglomeration nuclei are graded according to size before the further agglomeration, in which case only nuclei of a particular size or of a particular size range are used further. It is possible in this way to obtain agglomerates with a narrower size distribution than in a one-stage agglomeration.

The agglomeration takes place with the addition of a binder liquid. If more than one shell is constructed around an agglomeration nucleus in the process according to the invention, the binder liquids employed in the individual steps may be identical or different. The binder liquid may be selected from a wide range of liquids depending on the solid to be agglomerated. It is essential that the binder liquid is able to wet adequately the solid to be agglomerated. A measure which can be defined for the wetting ability of a binder liquid is a contact angle $\delta$, also referred to as wetting angle, which the liquid forms with the surface area of the solid. The contact angle $\delta$ is preferably below 90°, in particular below 60°.

The binder liquid can be chosen so that the solid to be agglomerated is soluble in it. It is self-evident that in this case the amount of binder liquid which can be used must be insufficient to dissolve completely the solid to be agglomerated. In general, less than 20% by weight, preferably 1 to 15% by weight, based on the weight of the solid to be agglomerated, of dissolving binder liquid are employed. During the agglomeration, the added binder liquid partly dissolves the solid to be agglomerated and, after the drying of the agglomerates, crystal bridges between the particles remain and hold the particles together.

In the particular case where the solid to be agglomerated is only slightly soluble or insoluble in the binder liquid it is possible to add to the binder liquid and/or to the solid to be agglomerated a substance which is soluble in the binder liquid and which leads, after the drying of the agglomerates, to material bridges between the particles. Examples suitable for this purpose are organic and inorganic salts such as sodium chloride, potassium chloride, potassium nitrate, sodium nitrate or sodium acetate, organic acids which are solid at room temperature, such as ascorbic acid, citric acid, adipic acid; sugars, e.g. monosaccharides such as glucose, fructose; di- or oligosaccharides such as sucrose or lactose; or urea.

In preferred embodiments, a polymeric binder is added to the binder liquid and/or the solid to be agglomerated. Examples of suitable polymeric binders are polyethylene glycols, polypropylene glycols and mixed polymers thereof, polyvinyllactam, in particular polyvinylpyrrolidone (PVP), copolymers of vinyllactams such as N-vinylpyrrolidone, N-vinylpiperidone and N-vinyl-e-caprolactam, N-vinylpyrrolidone with (meth)acrylic acid, (meth)acrylic acid esters, vinyl esters, in particular vinyl acetate, copolymers of vinyl acetate and crotonic acid, partially hydrolyzed polyvinyl acetate, polyvinyl alcohol, poly(hydroxyalkyl acrylates), poly(hydroxyalkyl (meth)acrylates), polyacrylates and poly(meth)acrylates, copolymers of methyl (meth)acrylate and acrylic acid, cellulose esters, cellulose ethers, in particular methylcellulose and ethylcellulose, hydroxyalkylcelluloses, in particular hydroxypropylcellulose, hydroxyalkylalkylcelluloses, in particular hydroxypropylethylcellulose, cellulose phthalates, in particular cellulose acetate phthalate and hydroxypropylmethylcellulose phthalate, and mannans, especially galactomannans. It is also possible to use biodegradable polymers such as polyhydroxyalkanoates, e.g. polyhydroxybutyric acid, polylactic acid, polyamino acids, e.g. polylysine, polyasparagine, polydioxane and polypeptides. The polymeric binders employed may be hydrophilic or hydrophobic depending on the nature of the solid to be agglomerated. The binders may be soluble or dispersed or dispersible in the particular binder liquid.

The initial agglomerates used in the process according to the invention comprise a first particulate solid which can be produced by any agglomeration process. It is preferred for the initial agglomerates to be produced by agglomerating the first particulate solid by means of agitative agglomeration or rewetting agglomeration using a binder liquid. Reference may be made to the above statements in this connection, but the agglomeration of the first particulate solid takes place in the absence of agglomeration nuclei with spontaneous nucleus formation. It is particularly advantageous to carry out the agglomeration of the first particulate solid to give initial agglomerates in the same apparatus in which the attachment of the second and, where appropriate, further particulate solids subsequently takes place. Thus, the first particulate solid can be agglomerated with the addition of a binder liquid to give initial agglomerates. The second particulate solid is added with further binder liquid or another binder liquid and agglomerated to form a shell around the initial agglomerates acting as agglomeration nuclei. If further shells are desired, the above procedure is repeated one or more times.

The initial agglomerates normally have a size of from 50 to 1500, preferably from 100 to 1000, μm. In a particular case where a narrow agglomerate size distribution is desired, the initial agglomerates can be graded according to size. Only initial agglomerates of a particular size or of a particular size range are used further. On attachment of further shells, the agglomerates from the preceding stage can likewise be fractionated according to size.

The process according to the invention has a variety of possible applications. For use in the pharmaceutical sector, for example, it is possible to produce agglomerates with a density gradient which can be changed radially outward from the center and with which the amount of active ingredient released can be influenced not only by the diameter but also by a diameter-dependent porosity. It is also possible by the process according to the invention to produce solid drug forms in which two different active ingredients are combined and are released successively. For example, the active ingredient in an outer shell may dissolve in the stomach, and the active ingredient in an inner shell or in the core may dissolve in the intestine. It is also possible by the process according to the invention for incompatible active ingredients to be converted into a single dosage form.

In the detergent sector, for example, an incrustation inhibitor and a bleach can be applied as shells on a surfactant core. The invention is illustrated in detail by the following examples.

EXAMPLE 1

This example illustrates the production of a core/shell agglomerate with crystalline theophylline (average particle size 100 μm) in the core and powdered theophylline (average particle size 10 μm) in the shell. The agglomeration takes the form of a rewetting agglomeration with cyclohexane as suspending liquid and water as binder liquid.

The agglomeration was carried out in a double-wall glass container with a capacity of 2l under ambient conditions. The stirring was effected by a stirrer with four blades which were adjusted at an angle of 45° and attached offset by 90°. 3 sheets with a width of 15 mm were introduced into the container as baffles.

700 ml of cyclohexane and 140 g of crystalline theophylline were introduced into the container. The crystalline theophylline was dispersed uniformly in the cyclohexane by stirring at 700 rpm. 73 ml of deionized water were introduced under a pressure of 2 bar through a nozzle which had a diameter of 1.4 mm and was fixed 6 cm below the surface of the suspension over the course of 30 min. The nuclei produced in this way were left in the suspension.

While stirring continuously at 700 rpm, the suspension was diluted with 700 ml of cyclohexane. Then 280 g of powdered theophylline were introduced through a funnel into the container. Subsequently, 109.2 ml of deionized water were added over the course of 45 min under the same conditions as previously.

The stirring container was then disassembled and its contents were filtered off through a suction funnel. The agglomerates were dried in air. Core/shell agglomerates with a porous core of crystalline theophylline and a compacted shell of powdered theophylline were obtained. FIG. 1 shows a scanning electron micrograph of a fractured agglomerate.

EXAMPLE 2

Core/shell agglomerates with a core of calcium carbonate (particle size about 4 μm) and a shell of a mixture of calcium carbonate (particle size about 4 μm) and riboflavin C were produced. Both core and shell contained polyvinylpyrrolidone (K value 30) as binder.

1000 g of calcium carbonate and 50 g of polyvinylpyrrolidone were introduced into the mixing vessel of an Eirich mixer and initially mixed for 2 min with maximum energy input. 160 g of water were added using a spray bottle over the course of 40 s with maximum energy input. Mixing was then continued for 10 s without further addition of liquid.

4000 g of calcium carbonate, 300 g of riboflavin C and 215 g of polyvinylpyrrolidone were initially mixed for 5 min. 1050 g of this mixture were added to the agglomerate nuclei produced as above. Mixing was carried out for 48 s with a star-type agitator at an agitator speed of 1500 rpm and a plate speed of 84 rpm with the vessel and agitator moving in opposite directions. Over the course of 25 s, 100 g of water were added using a spray bottle, and then mixing was continued for 74 s. Core/shell agglomerates with a core of uncolored calcium carbonate and a shell of yellow-colored calcium carbonate were obtained.

We claim:

1. A process for producing agglomerates with a core/shell structure, in which
   i) initial agglomerates containing a first particulate solid are provided;
   ii) a second particulate solid is agglomerated in the presence of the initial agglomerates and, optionally,
   iii) an nth (n≧3) particulate solid is agglomerated in the presence of the (n−1)th stage agglomerates,
      wherein the agglomeration in step ii) and/or iii) takes place by
      a) dispersing the initial agglomerates and the second particulate solid or the (n−1)th stage agglomerates and the nth particulate solid, respectively, in a suspending liquid in which both the first particulate solid and the second particulate solid or the (n−1)th particulate solid and the nth particulate solid, respectively, are essentially insoluble the
      b) introducing into the suspending liquid, a binder liquid which is essentially immiscible with the suspending liquid, and
      c) drying the resulted agglomerates of step b) to obtain a core/shell structure.

2. A process as claimed in claim 1, wherein the first and second particulate solid and/or for at least one value of n the (n−1)th and the nth particulate solid have different particle sizes.

3. A process as claimed in claim 2, wherein the second particulate solid has a smaller particle size than the first particulate solid and/or for at least one value of n the nth particulate solid has a smaller particle size than the (n−1)th particulate solid.

4. A process as claimed in claim 2, wherein the first and second and/or for at least one value of n the (n−1)th and nth particulate solid are of identical chemical composition.

5. A process as claimed in claim 1, wherein the first particulate solid has a particle size of 50–800 μm.

6. A process as claimed in claim 1, wherein the second particulate solid has a particle size of less than 500 μm.

7. A process as claimed in claim 1, wherein the agglomeration in step ii) and/or iii) takes place in the presence of a bridge-forming substance and/or of a binder.

* * * * *